US007491363B2

(12) United States Patent
Nadler

(10) Patent No.: US 7,491,363 B2
(45) Date of Patent: Feb. 17, 2009

(54) FLUID PROCESSING DEVICE

(75) Inventor: Timothy K. Nadler, Framingham, MA (US)

(73) Assignee: Applied Biosystems, LLC., Carlsbad, CA (US)

( * ) Notice: Subject to any disclaimer, the term of this patent is extended or adjusted under 35 U.S.C. 154(b) by 881 days.

(21) Appl. No.: 10/891,646

(22) Filed: Jul. 15, 2004

(65) Prior Publication Data

US 2006/0013741 A1 Jan. 19, 2006

(51) Int. Cl.
*G01N 35/00* (2006.01)

(52) U.S. Cl. ......................... 422/63; 210/359; 422/101; 422/104

(58) Field of Classification Search ................... 422/63, 422/64, 99, 101, 103, 104, 55, 58, 68.1, 81, 422/82, 102; 204/600, 601, 627; 436/43; 137/87.01, 88, 89, 98, 99; 210/359
See application file for complete search history.

(56) References Cited

U.S. PATENT DOCUMENTS 5,061,381 A 10/1991 Burd
5,256,376 A 10/1993 Callan et al.
5,587,128 A 12/1996 Wilding et al.
5,866,345 A 2/1999 Wilding et al.
5,955,029 A 9/1999 Wilding et al.
5,976,336 A 11/1999 Dubrow et al.
6,063,589 A * 5/2000 Kellogg et al. ................ 435/24
6,156,181 A 12/2000 Parce et al.
6,156,273 A 12/2000 Regnier et al.
6,527,432 B2 * 3/2003 Kellogg et al. ........... 366/182.1
6,656,428 B1 * 12/2003 Clark et al. .................... 422/58
6,743,632 B2 6/2004 Clarke et al.
7,192,559 B2 * 3/2007 Chow et al. ................. 422/100
7,247,274 B1 * 7/2007 Chow .......................... 422/100

OTHER PUBLICATIONS

Notification Concerning Transmittal of International Preliminary Report on Patentability dated Jan. 25, 2007, from PCT Application No. PCT/US2005/021990.
International Preliminary Report on Patentability dated Jan. 16, 2007, from PCT Application No. PCT/US2005/021990.
Written Opinion of the International Searching Authority dated Jul. 27, 2006, from PCT Application No. PCT/US2005/021990.

* cited by examiner

*Primary Examiner*—Joseph W Drodge
(74) *Attorney, Agent, or Firm*—Kilyk & Bowersox, P.L.L.C.

(57) ABSTRACT

A fluid processing device is provided that enables the controlled flow of a liquid sample along a fluid processing pathway through various sample-containment regions and is free of fluid flow blockages or valves along the processing pathway. A system is also provided for processing the device and includes a rotatable platen and alignment features that can hold the fluid processing device in two or more different orientations on the rotatable platen. A method is also provided for processing a sample, in the device, with the system.

35 Claims, 3 Drawing Sheets

FLUID PROCESSING DEVICE

FIELD

The present teachings relate to fluid processing devices and methods of controlling fluid flow in such devices.

BACKGROUND

Fluid processing devices including microfluidic processing devices often require complicated control and valving arrangements to manipulate the flow of liquid samples through such devices. It would be desirable to provide a fluid processing device that would not require complicated valving or a separate system for effecting valving in the device. It would also be desirable to provide a device that enables the accurate and controlled manipulation of a liquid sample along a processing pathway that includes a plurality of different sample-containment regions.

SUMMARY

According to various embodiments, the present teachings provide a device that includes a substrate having a first surface and a second surface, and one or more sample processing pathways at least partially defined by the substrate. Each of the processing pathways can be generally zig-zag in shape and can include features that enable the controlled flow of a fluid sample from one sample-containment region to the next, without overshooting a desired sample-containment region and without the use of valves. According to various embodiments, each sample processing pathway can include an inlet, first, second, and third sample-containment regions, and first, second, and third fluid communications. The first and second sample-containment regions can each include a respective input opening and a respective output opening. The third sample-containment region can include at least an input opening and can optionally also include an output opening. The first fluid communication can be capable of directing a fluid, for example, a liquid material, in a first direction from the inlet to the input opening of the first sample-containment region. The second fluid communication can be capable of directing a material in a second direction from the output opening of the first sample-containment region to the input opening of the second sample-containment region. The third fluid communication can be capable of directing a material in a third direction from the output opening of the second sample-containment region to the input opening of the third sample-containment region. According to various embodiments, the first and third directions can each be transverse to the second direction. The first and third directions can be parallel or substantially parallel to one another. By substantially parallel what is meant is that the two directions are skewed with respect to one another by no more than about 10°, for example, by no more than about 5°. The second direction can be transverse, for example, perpendicular, to the first direction. The second direction can be angled with respect to either or both of the first and third directions by, for example, from about 20° to about 90°, from about 30° to about 60°, from about 40° to about 50°, or about 45°. The fluid communications and/or the entire sample processing pathway can be free of any flow-interuptable blockages or valves.

According to various embodiments, the present teachings provide a device as described above, but wherein the first and third directions are not necessarily substantially parallel to one another. According to such embodiments, the first, second, and third fluid communications can be arranged such that upon spinning the device about an axis of rotation while in a first orientation, the device is capable of moving liquid through the first and/or third communications while preventing liquid from moving through the second fluid communication. The device can be designed such that when oriented in a second orientation that differs from the first orientation, and spun, the device can be capable of moving a liquid through the second fluid communication while preventing liquid from moving through the first and third fluid communications.

According to various embodiments, the present teachings provide a system that includes one or more devices as described above, a rotatable platen, and a holder disposed in or on the rotatable platen and capable of holding the device in one of at least two different orientations while the rotatable platen is spun. The system can further include a drive unit and control unit for controlling the rotation of the rotatable platen, and can include alignment features capable of aligning the device in the at least two different orientations on the rotatable platen.

According to various embodiments, a method is provided for processing a sample in a device that includes a plurality of sample-containment regions and a plurality of fluid communications respectively fluidly interconnecting respective adjacent pairs of the sample-containment regions. The method can include holding the fluid processing device in a first orientation on a rotatable platen, spinning the rotatable platen about an axis of rotation, holding the fluid processing device in a second orientation on a second rotatable platen, wherein the second orientation differs from the first orientation, and spinning the second rotatable platen about a second axis of rotation while holding the fluid processing device in the second orientation. According to various embodiments, the second rotatable platen and the first rotatable platen are the same rotatable platen, and the second axis of rotation is the same as the first axis of rotation. The device can include first, second, third, and fourth sample-containment regions serially connected to one another through respective first, second, and third fluid communications, wherein the first and third fluid communications can be arranged parallel or substantially parallel to one another, and wherein the second fluid communication is arranged transverse to the directions of flow through the first and/or third fluid communications, for example, at an angle of from about 20° to about 90°, from about 30° to about 60°, from about 40° to about 50°, or about 45°, with respect to the directions of flow through one or both of the first and third fluid communications.

It is to be understood that both the foregoing general description and the following detailed description are exemplary and explanatory only and are intended to provide a further explanation of the various and many embodiments described herein.

BRIEF DESCRIPTION OF THE DRAWINGS

Various embodiments of the present teachings are exemplified in the accompanying drawings. The teachings are not limited to the embodiments depicted in the drawings, and include equivalent structures and methods as set forth in the following description and as would be known to those of ordinary skill in the art in view of the present teachings. In the drawings.

Other various embodiments of the present teachings will be apparent to those skilled in the art from consideration of the specification and practice of the teachings described herein, and the detailed description that follows. It is intended that the specification and examples be considered as exemplary only.

DETAILED DESCRIPTION

Figure 1:
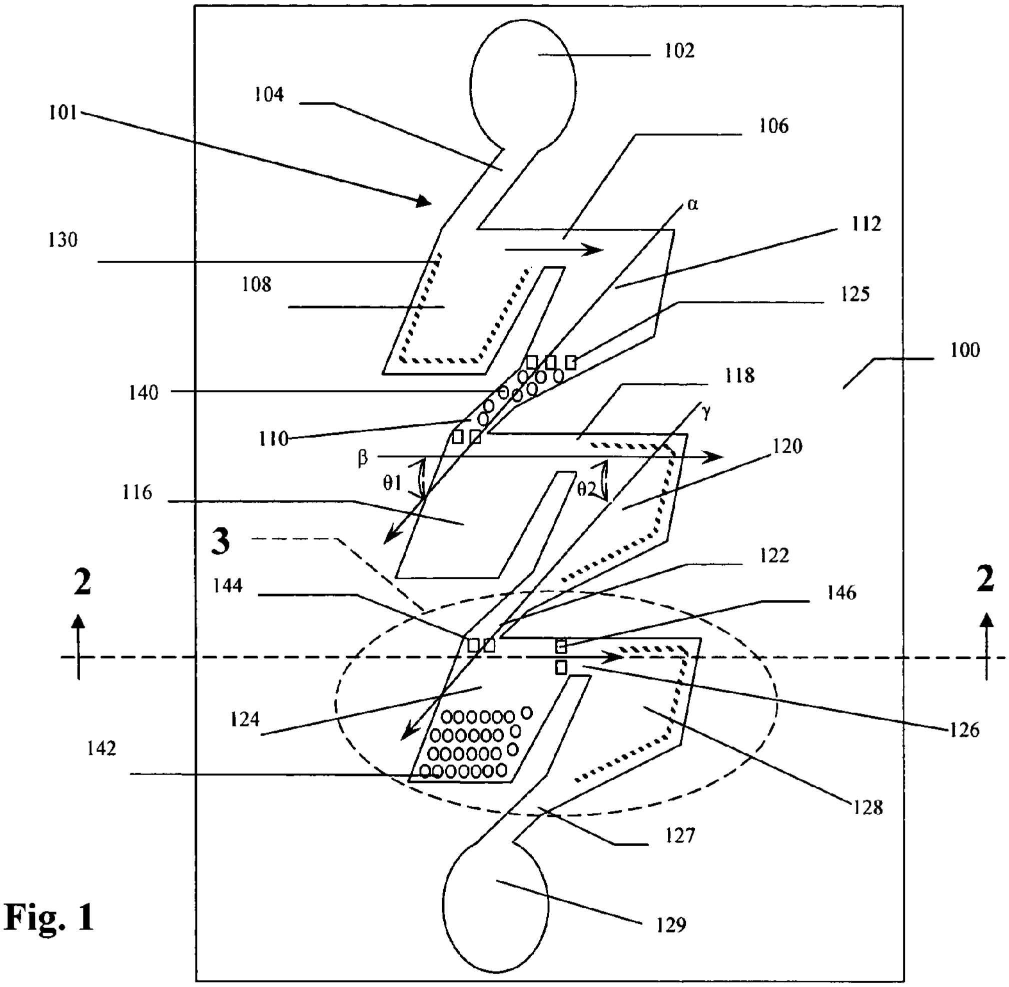
FIG. 1 is a top plan view of a device according to various embodiments and including a transparent top cover layer.

With reference to FIG. 1, a device 100 is provided that includes a sample processing pathway 101. The sample processing pathway 101 includes an inlet 102 and an outlet 129. Between the inlet 102 and the outlet 129 are a plurality of serially and fluidly connected sample-containment regions, including first sample-containment region 108, second sample-containment region 112, third sample-containment region 116, fourth sample-containment region 120, fifth sample-containment region 124, and sixth sample-containment region 128. A first fluid communication 104 is provided between the inlet 102 and an input opening to the first sample-containment region 108. A second fluid communication 106 is provided between an output opening of the first sample-containment region 108 and an input opening of the second sample-containment region 112. Upon application of a centripetal force to the device 100, a liquid sample that is loaded into inlet 102 can be forced through first fluid communication 104 and into the first sample-containment region 108 where it can react, for example, with a reagent 130. The reagent 130 can be a dried reagent that has been predisposed, pre-dried down, or otherwise pre-loaded within the first sample-containment region 108. A third fluid communication 110 is provided between the second sample-containment region 112 and the third sample-containment region 116. The third fluid communication 110 can include a reactant or purification material disposed therein, for example, particulate filter material, ion-exchange particles, as shown, purification beads 140, for example anion exchange particles, cation exchange particles, reversed-phase materials, hydrophobic interaction materials, metal chelate materials, immobilized affinity materials, size exclusion particles, and/or combinations thereof.

As shown in FIG. 1, the purification beads 140 can be retained within the third fluid communication 110 by one or more weirs 125. The distance between adjacent weirs 125 or between the weirs 125 and the sidewalls of the third fluid communication 110 can be less than the average particle diameter of the purification beads 140 retained in the third fluid communication 110. The purification beads 140 can be, for example, size-exclusion, ion-exchange beads as described in U.S. patent application Ser. No. 10/414,179, filed Apr. 14, 2003, which is incorporated herein in its entirety by reference.

The third fluid communication 110 communicates an output opening of the second sample-containment region 112 to an input opening of the third sample-containment region 116. The fourth fluid communication 118 can be provided between an output opening of third sample-containment region 116 and an input opening of the fourth sample-containment region 120. As can be seen in FIG. 1, the first fluid communication 104 and the third fluid communication 110 extend in directions that are parallel or substantially parallel to one another, and the second fluid communication 106 and the fourth fluid communication 118 extend in directions that are parallel or substantially parallel to one another. As also shown in FIG. 1, the first and third fluid communications 104, 110 extend in directions that are transverse to the directions in which each of the second fluid communication 106 and the fourth fluid communication 118 extend. Each of the angles, depicted as theta one ($\theta 1$) and theta two ($\theta 2$), can each independently be, for example, from about 20° to about 90°, from about 30° to about 60°, from about 40° to about 50°, or about 45°. The fourth sample-containment region 120 can be in fluid communication with the fifth sample-containment region 124 through a fifth fluid communication 122. The fifth sample-containment region 124 can be provided with the first set of weirs 144 at an input opening of the fifth sample-containment region. The fifth sample-containment region 124 can also be provided with a second set of weirs 146 at an output opening thereof. The sets of weirs 144, 146, can be included to retain particulate material in the fifth sample-containment region 124, for example, to retain size-exclusion, ion-exchange purification beads as described above.

A sixth fluid communication 126 can be provided between the fifth sample-containment region 124 and the sixth sample-containment region 128. From the sixth sample-containment region 128, a seventh fluid communication 127 can be provided to fluidly interconnect the sixth sample-containment region 128 with the outlet 129. The outlet 129, the inlet 102, the remainder of the sample processing pathway 101, any combination thereof, or the entire sample processing pathway, can be covered with a cover film that can be pierced or broken by a capillary, cannula, needle, syringe, pipettor, or other sample withdrawing device for the purpose of removing a processed sample or portion thereof from the outlet 129. The outlet 129 can be arranged as an output reservoir, an output region, an output recess, or, as shown in FIG. 1, an output well.

According to various embodiments, at least one of the first, second, and third sample-containment regions has one or more maximum dimension that is from about 100 microns to about two centimeters.

According to various embodiments, and as an alternative to the embodiment shown in FIG. 1, the first and third fluid communications can extend in opposite directions, with each being oppositely transverse to the second fluid communication. For example, a spiral pathway design can be provided according to various embodiments.

In the embodiment shown in FIG. 1, it can be seen that dried reagent can be predisposed, dried-down, printed, or otherwise pre-loaded, within any one or any plurality of the various sample-containment regions. In the exemplary embodiment shown in FIG. 1, first sample-containment region 108, fourth sample-containment region 120, and sixth sample-containment region 128, are each provided with pre-loaded reagents. The pre-loaded reagents can be, for example, dried-down probes, primers, tags, labels, reactants, buffers, or other reagents useful in nucleic acid sequence amplification, sequencing, ligation, or the like, reactions as known to those of ordinary skill in the art. Examples of reagents that can be used and/or preloaded include: for example, reducing agents (e.g. dithiothreitol, tris[2-carboxyethyl]phosphine hydrochloride), alkylating agents (e.g. iodoacetic acid, iodoacetamide), derivatization reagents (e.g. N-hydroxysuccinamide activated biotin, sulfosuccinimidyl-4-O-[4,4'-dimethoxytrityl]butyrate, 2-iminothiolane hydrochloride, fluorescein isothiocyanate), cross-linking reagents (e.g. dimethyl pimelimidate hydrochloride, disuccinimidyl suberate, 1-ethyl-3-[3-dimethylaminopropyl]-carbodiimide hydrochloride), lyophilized enzymes (e.g. trypsin, chymotrypsin, pepsin, papain), immobilized enzymes (e.g. immobilized trypsin), catalysts, enzyme inhibitors, enzyme substrates, dyes, immobilized reagents, or combinations thereof.

According to various embodiments, the pre-loaded reagents can include protein-modifying reagents, biotinylating reagents, or protein labeling reagents, for example, as described in the Applied Biosystems' 2001 ICAT™ Kit for Protein Labeling brochure entitled "Protocol for Modifying Proteins with an Isotope-Labeled, Sulfhydryl-Modifying Biotinylation Reagent," available from Applied Biosystems, Foster City, Calif.

Figure 2:
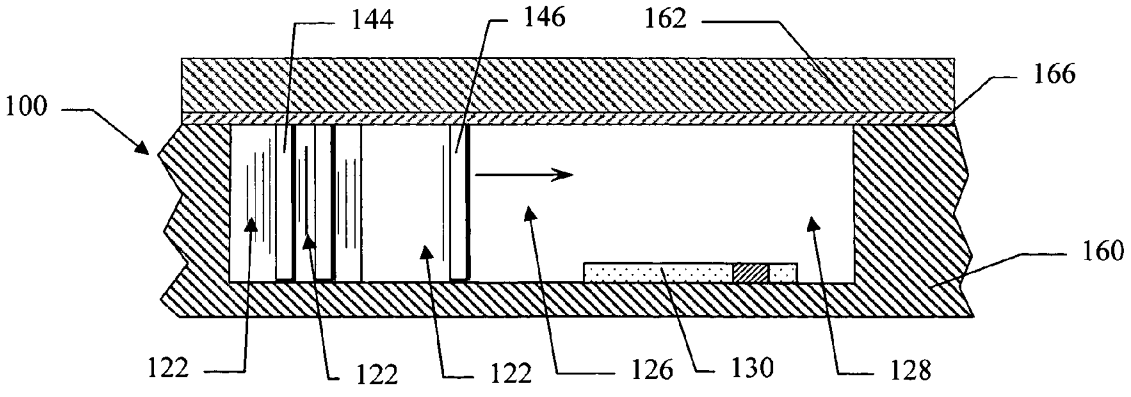
FIG. 2 is a cross-sectional view taken along line 2-2 of in FIG. 1.

FIG. 2 is a cross-sectional view taken along line 2-2 of FIG. 1. As can be seen in FIG. 2, the device 100 includes a substrate 160 having the fluid processing pathway formed therein. The top surface of the substrate 160 is covered with a cover layer 162 attached to the top surface of the substrate 160 by an adhesive material layer 166. The cover layer 162 can be transparent and can have a thickness of, for example, from about 0.01 mm to about 5 mm, from about 0.1 mm to about 3.0 mm, or from about 0.3 mm to about 1.0 mm. The cover layer 162 can comprise a film or sheet of transparent plastic material, for example, a material that includes polyethylene, polypropylene, other polyolefins, polytetrafluoroethylene, polyethylene terephthalate, polystyrene, or the like. The adhesive material layer 166 can include an inert adhesive that does not deleteriously affect a sample or reagent processed or used in the device. Alternatively, the cover layer can be heat-sealed to the top surface of the substrate without an adhesive layer disposed between the cover layer and the substrate.

According to various embodiments, the substrate can be from about 0.2 mm to about 5 cm in thickness, for example, from about 0.5 mm to about 10 mm thick or from about 1.0 mm to about 7 mm thick. The substrate 160 can be made of, or include, a plastic material, a glass material, a metal material, or the like. The substrate 160 can be made of, or include, a polycarbonate, a polyolefin, a cyclic polyolefin, a cyclic olefin copolymer, a fluoropolymer, a siloxane, a polymethyl methacrylate, a silicon or silica material, or the like. Any weirs or other retention features along the fluid processing pathway 101 (FIG. 1) can be made of the same material, or of a different material, as the substrate 160.

As can be seen in FIG. 2, the sixth sample containment region 128 can include a dried reagent 130 pre-loaded therein. Depending upon the desired chemistries with which a sample is to be processed or to which a sample is to be exposed, the dried reagents 130 can be, or include, any of a number of reagents as described herein.

Figure 3:
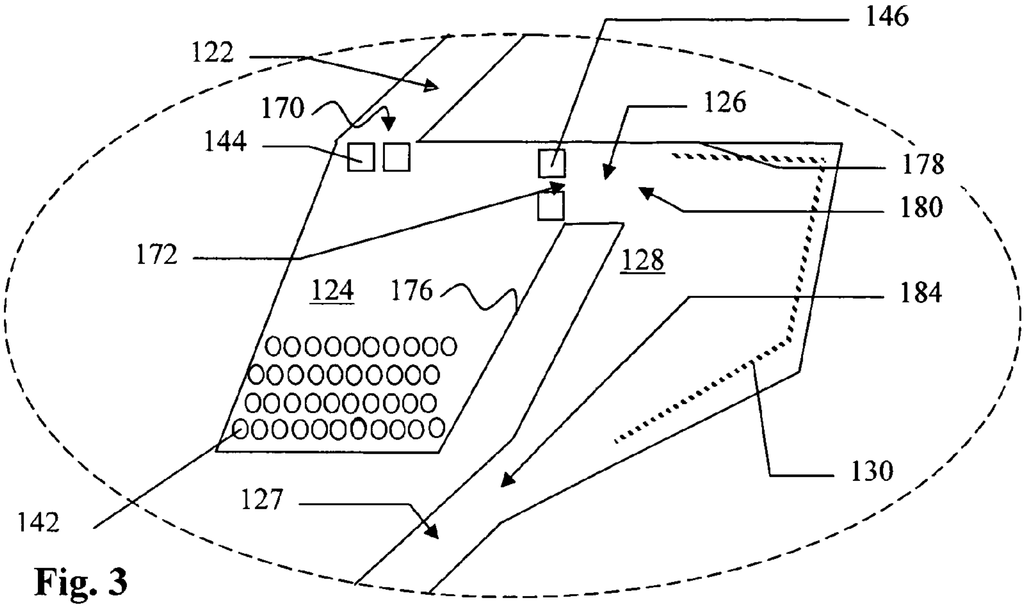
FIG. 3 is an enlarged view of region 3 of FIG. 1

With reference to FIG. 3, region 3 shown in FIG. 1 is depicted in an enlarged view. As can be seen in FIG. 3, the fifth sample-containment region 124 can be preloaded with a plurality of treatment particles 142, for example, a plurality of size-exclusion, ion-exchange beads as described above. Weirs 144 and 146 can be used to retain the beads 142 within the fifth sample-containment region 124. Fifth sample-containment region 124 can include an input region or opening 170 and an output region or opening 172 which can each be at least partially restricted by the weir sets 144 and 146, respectively.

The fifth sample-containment region 124 can be at least partially defined by one or more sidewalls 176. According to various embodiments and as shown in FIG. 3, the sidewall 176 can be formed to slope toward the output opening 172 such that a volume of liquid within fifth sample-containment region 124, when subjected to a centripetal force in a direction from left to right with respect to the drawing figure, would be directed toward the output opening 172 and thus through sixth fluid communication 126 and into sixth sample-containment region 128. Sixth sample-containment region 128 can be provided, as shown, with an input region or opening 180 and an output region or opening 184. The sidewalls of sixth sample-containment region 128 can be formed such that when a volume of liquid within sixth sample-containment region 128 is subjected to a centripetal force in a direction from top to bottom with respect to the drawing figure, would be directed toward and through the seventh fluid communication 127 and subsequently into the outlet 129 (FIG. 1) of the device.

Figure 4:
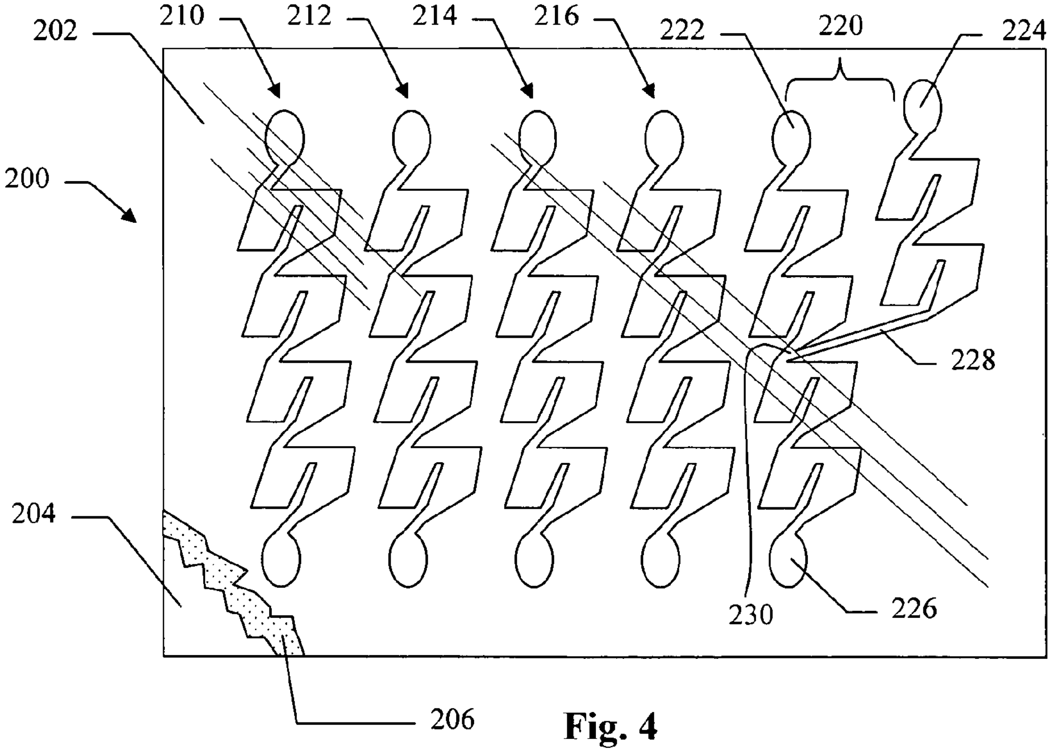
FIG. 4 is a top plan view of a device according to various embodiments including six separate sample processing pathways, a transparent cover layer, and a transparent adhesive layer for adhering the transparent cover layer to the device substrate.

Another embodiment of the present teachings is depicted in FIG. 4 which shows a card-type fluid processing device 200 made of a substrate 204, a cover layer 202, and an adhesive layer 206 that adheres the cover layer 202 to the substrate 204. The substrate 204, cover layer 202, and adhesive layer 206 can be as described above. According to the embodiment depicted in FIG. 4, the card-type fluid processing device 200 can include a plurality of separate fluid processing pathways 210, 212, 214, 216, 220, for example, five as shown. Each of the fluid processing pathways can include any combination of the sample-containment regions, fluid communications, treatment materials, and pre-loaded reagents, depicted and described in connection with FIGS. 1-3 herein. Fluid processing pathway 220 exemplifies a pathway including two inlets 222, 224, one outlet 226, and a merge channel 228 that interconnects a first pathway portion beginning at inlet 222 and a second pathway portion beginning at inlet 224. The merge channel 228 can be arranged to extend a direction that enables mixing of the contents of the two pathway portions at a desired downstream stage or position along the greater pathway 220. The merge channel can be parallel, or angled, with respect to the direction of fluid flow through the fifth fluid communication 230 of the pathway portion beginning at inlet 222. If angled, the merge channel 228 can be angled at from about 1° to about 40°, for example, from about 3° to about 20° or from about 4° to about 10°, with respect to the direction of flow through the fifth fluid communication 230.

According to various embodiments, the device can include a merging fluid processing pathway having two or more separate inlets, merging flow pathways, and a single outlet. Such embodiments can be useful in providing the controlled mixing together of two or more fluid samples or reagents at a desired time or stage during a sample processing procedure.

FIGS. **5*a* and 5*b* depict a system 300 according to various embodiments, for processing a device 304 as described herein. The system can include a rotatable platen 302 and at least one holder capable of holding a respective device to the rotatable platen 302. In the embodiment exemplified in FIGS. 5*a* and 5*b* two devices 304 and 306 are held to the rotatable platen 302 by two holders 320, 322. Each holder can include a recess in the rotatable platen, clips, snaps, pins, bands, or the like, arranged to securely mount or hold a respective device to the rotatable platen 302**.

The system depicted in FIGS. **5*a* and 5*b* can include a drive unit and a control unit for rotatably driving the rotatable platen 302 about an axis of rotation 328. The rotatable platen 302 can include individually pivotable device holders 320 and 322. Each device holder 320 and 322 can pivot between two or more stations, that is, to achieve two or more different orientations of the device held by the holder, with respect to the rotatable platen 302**. In the embodiments shown in FIGS.

Figure 5A:
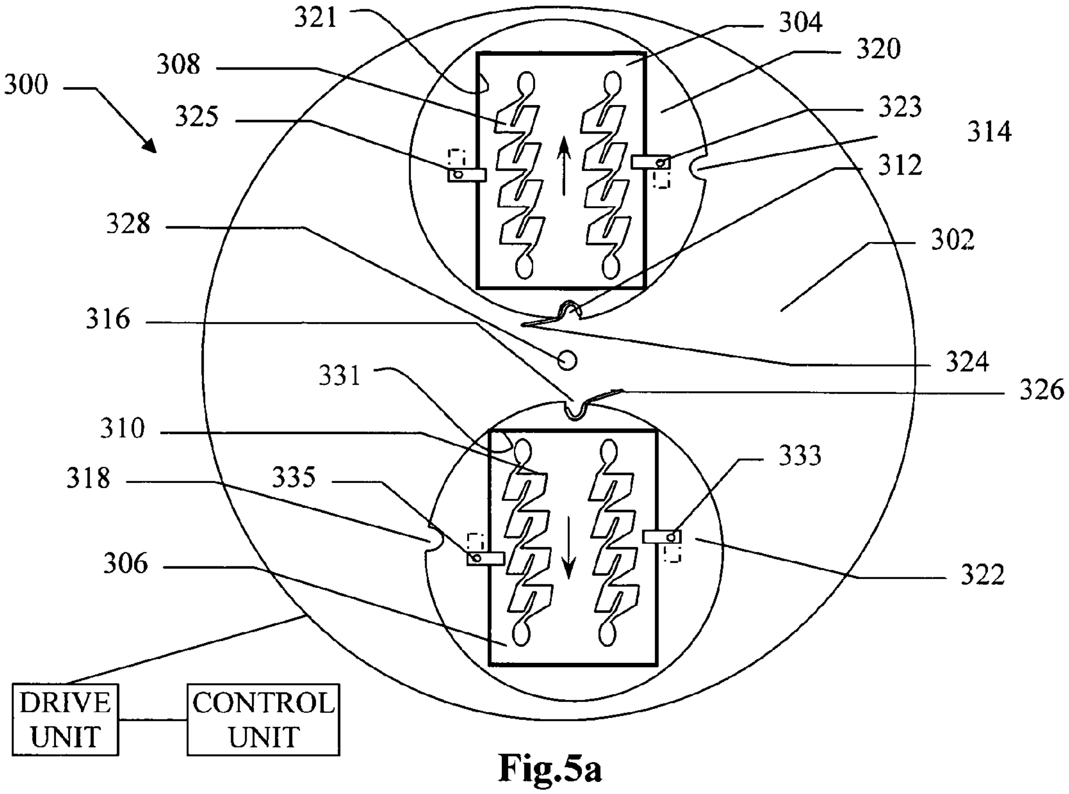
FIG. 5*a* is a top plan view of a system that includes a rotating platen and two devices, wherein each device is held by an alignment clip in a respective first orientation on the rotating platen.
Figure 5B:
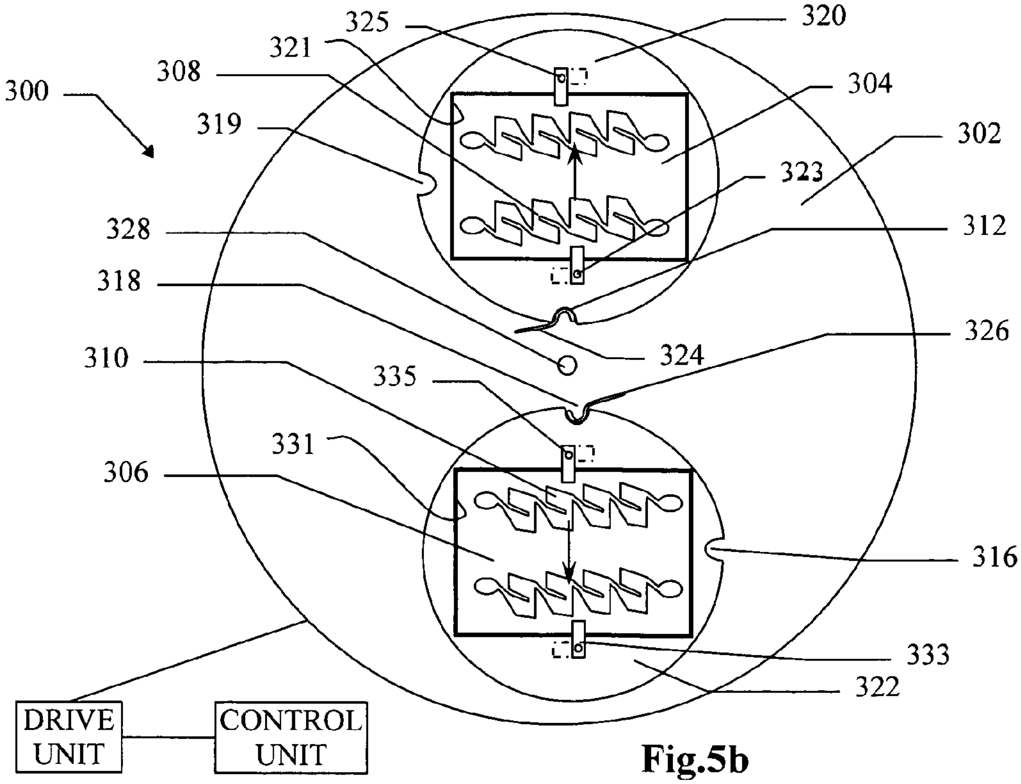
FIG. 5*b* is a top plan view of the system shown in FIG. 5*a* but wherein each of the two devices is oriented in a respective, different, second orientation that is transverse, in the case shown, perpendicular, to the first orientation.

5*a* and 5*b*, the two orientations of each device 304 or 306 are perpendicular to one another. Each device holder 320 and 322 can be pivotably mounted to the rotatable platen 302 and can include a recess, depression, frame, notch, or other appropriate holding feature for retaining, securing, or otherwise holding, the device. As shown in FIGS. 5*a* and 5*b*, the holders 320 and 322 can respectively include pivotable clips 323, 325 and 333, 335. As shown in FIGS. 5*a* and 5*b*, two card-type fluid processing devices as described herein, each having two fluid processing pathways 308 and 310, are shown respectively held on the device holders 320 and 322. The device holders 320 and 322 can be provided with recesses or other features to secure the fluid processing devices 304 and 306 thereon. Each device holder can include one or more alignment feature such as alignment notches 312, 314, 316, and 318. The rotatable platen 302 can be provided with corresponding alignment pins or alignment notch clips 324 and 326 which can matingly engage with the alignment notches of the device holders 320 and 322. According to various embodiments, the fluid processing devices themselves can be included with alignment notches and the rotatable platen can be provided with device holder such that the fluid processing devices can be secured, held, or otherwise mounted, directly on the rotating platen in two or more orientations without the need for a device holder feature.

As shown in FIGS. 5*a* and 5*b*, alignment notches 312 and 314 of the device holder 320 can engage the alignment clip 324 such that the device holder 320 and, correspondingly, the fluid processing device 304, can be oriented in either of two orientations on the rotating platen. Likewise, device holder 322 can be oriented in either of two positions through the engagement of alignment clip 326 in either alignment notch 316 or alignment notch 318, respectively. FIG. 5*a* shows each device holder 320 and 322 oriented in a first orientation on the rotating platen and the directional arrow shown on each fluid processing device 304 and 306 indicates the direction of centripetal force that would result from rotating the rotatable platen 302 about the axis of rotation 328. FIG. 5*b* shows the device holders 320 and 322 each oriented in a second direction that is perpendicular to the first direction. As shown in 5*b*, the directional arrows depict the direction of centripetal force that would be exerted, and as shown is in a transverse direction relative to the direction of centripetal force indicated in FIG. 5*a*.

As shown in FIGS. 5*a* and 5*b*, by changing the orientation of the fluid processing devices as described above, a liquid sample disposed in the fluid processing pathways 308 and 310 can be made to move from one sample-containment region to the next, with each reorientation of the device. Accordingly, a controlled zig-zag flow pattern of a liquid sample can be achieved, through a plurality of different treatment regions without the need to include any valves or fluid flow blockage structures between adjacent treatment regions in the fluid processing device.

While the present teachings have been described herein in connection with detailed embodiments, it is to be understood that various modifications can be made that are within the spirit of the present teachings. The present teachings are not limited to these detailed embodiments described herein but include all modifications that would be apparent to those skilled in the art.

What is claimed is:

1. A system for processing a fluid, comprising a device, a rotatable platen, and a holder capable of holding the device on the rotatable platen in two or more different orientations, the holder being pivotably mounted to the platen so as to pivot with respect to the platen between at least a first orientation and a second orientation, the device comprising:

a substrate, the substrate including a first surface and a second surface; and one or more sample processing pathways at least partially defined by the substrate, each sample processing pathway comprising an inlet, a first sample-containment region, a second sample-containment region, and a third sample-containment region, the first sample-containment region including an input opening and an output opening, the second sample-containment region including an input opening and an output opening, and the third sample-containment region including at least an input opening, a first fluid communication capable of directing a material in a first direction from the inlet to the input opening of the first sample-containment region, a second fluid communication capable of directing a material in a second direction front the output opening of the first sample-containment region to the input opening of the second sample-containment region, and a third fluid communication capable of directing a material in a third direction from the output opening of the second sample-containment region to the input opening of the third sample-containment region, wherein (1) the first and third directions are substantially parallel to one another, (2) the second direction is transverse to the first direction, (3) upon rotation of the platen while the device is held by the holder in the first orientation, the fluid moves through the first fluid communication, (4) upon rotation of the platen while the device is held by the holder in the second orientation, the fluid moves through the second fluid communication, and (5) the different orientations of the holder on the rotatable platen provide different orientations of the one or more sample processing pathways relative to the rotatable platen.

2. The device of claim 1, wherein the first direction and the second direction are angled with respect to one another at an angle of from about 30° to about 90°.

3. The device of claim 1, wherein the first direction and the second direction are angled with respect to one another at an angle of from about 40° to about 55°.

4. The device of claim 1, wherein each of the first, second, and third fluid communications has a center and the centers are arranged on a common plane, and the common plane is parallel to at least one of the first surface and the second surface.

5. The device of claim 1, wherein the one or more sample processing pathways further comprises a dried-down reagent disposed therein.

6. The device of claim 5, wherein the one or more sample processing pathways further comprises a sidewall and the dried-down reagent is incorporated in or on the sidewall.

7. The device of claim 1, wherein the one or more sample processing pathways further comprises at least one size-exclusion retaining member disposed therein.

8. The device of claim 1, wherein the one or more sample processing pathways further comprises a particulate material disposed therein.

9. The device of claim 8, wherein the particulate material comprises at least one of a sample purification material, and a size-exclusion material.

10. The device of claim 8, wherein the one or more sample processing pathways farther comprises at least one size-exclusion retaining member disposed therein and the particulate material is retained in the one or more sample processing pathways by the at least one size-exclusion retaining member.

11. The device of claim 1, wherein the third sample-containment region includes an output opening and each of the one or more sample processing pathways further comprises a fourth sample-containment region including an input opening, and a fourth fluid communication capable of directing a material in a fourth direction from the output opening of die third sample-containment region to the input opening of the fourth sample-containment region, wherein the second and fourth directions are parallel to one another.

12. The device of claim 1, wherein the one or more sample processing pathways are formed in the substrate.

13. The device of claim 1, further comprising at least one cover that at least partially defines the one or more sample processing pathways.

14. The device of claim 1, wherein the substrate is shaped as a rectangular card.

15. The device of claim 1, wherein the substrate is shaped as a circular disc.

16. The device of claim 1, wherein at least one of the first sample-containment region, the second sample-containment region, and the third sample-containment region, has a volume of from about 0.5 μl to about 500 μl.

17. The device of claim 1, wherein a maximum cross-sectional area of at least one of the first sample-containment region, the second sample-containment region, and the third sample-containment region, is larger than a maximum cross-sectional area of at least one of the first fluid communication, the second fluid communication, and the third fluid communication.

18. The device of claim 1, wherein at least one of the first, second, and third sample-containment regions has one or more maximum dimension that is from about 100 microns to about two centimeters.

19. The device of claim 1, wherein the fluid processing pathway is free of valves.

20. The system of claim 1, wherein the device and at least one of the rotatable platen and the holder comprises one or more alignment features capable of holding the device in or on the rotatable platen in the at least two different orientations.

21. The system of claim 1, further comprising a drive unit capable of rotating the rotatable platen, and a control unit capable of controlling the drive unit.

22. A system for processing a fluid, comprising a device, a rotatable platen, and a holder capable of holding the device on the rotatable platen in two or more different orientations, the holder being pivotably mounted to the platen so as to pivot with respect to the platen between at least a first orientation and a second orientation, the device comprising:

a substrate, the substrate including a first surface and a second surface; and one or more sample processing pathways at least partially defined by the substrate, each sample processing pathway comprising an inlet, a first sample-containment region, a second sample-containment region, and a third sample-containment region, the first sample-containment region including an input opening and an output opening, the second sample-containment region including an input opening and an output opening, and the third sample-containment region including at least an input opening, a first fluid communication capable of directing a material in a first direction from the inlet to the input opening of the first sample-containment region, a second fluid communication capable of directing a material in a second direction from the output opening of the first sample-containment region to the input opening of the second sample-containment region, and a third fluid communication capable of directing a material in a third direction from the output opening of the second sample-containment region to the input opening of the third sample-containment region, wherein (1) the first direction is transverse to the second direction, (2) the second direction is transverse to the third direction, (3) upon rotation of the platen while the device is held by the holder in the first orientation, the fluid moves through the first fluid communication, (4) upon rotation of the platen while the device is held by the holder in the second orientation, the fluid moves through the second fluid communication, and (5) the different orientations of the holder on the rotatable platen provide different orientations of the one or more sample processing pathways relative to the rotatable platen.

23. The device of claim 22, wherein the first direction and the second direction are angled with respect to one another at an angle of from about 30° to about 90°.

24. The device of claim 22, wherein the one or more sample processing pathways further comprises a particulate material disposed therein.

25. The device of claim 22, wherein the third sample-containment region includes an output opening and each of the one or more sample processing pathways further comprises a fourth sample-containment region including an input opening, and a fourth fluid communication capable of directing a material in a fourth direction from the output opening of the third sample-containment region to the input opening of the fourth sample-containment region, wherein the second and fourth directions are parallel to one another.

26. The device of claim 22, further comprising at least one cover that at least partially defines the one or more sample processing pathways.

27. The device of claim 22, wherein the fluid processing pathway is free of valves.

28. A system for processing a liquid, comprising a device, a rotatable platen, and a holder capable of holding the device in or on the rotatable platen in two or more different orientations, the holder being pivotably mounted to the platen so as to pivot with respect to the platen between at least a first orientation and a second orientation, the device comprising:

a substrate, the substrate including a first surface and a second surface; and one or more sample processing pathways at least partially defined by the substrate, each sample processing pathway comprising an inlet, a first sample-containment region, a second sample-containment region, and a third sample-containment region, the first sample-containment region including an input opening and an output opening, the second sample-containment region including an input opening and an output opening, and the third sample-containment region including at least an input opening, a first fluid communication between the inlet and the input opening of the first sample-containment region, a second fluid communication between the output opening of the first sample-containment region and the input opening of the second sample-containment region, and a third fluid communication between the output opening of the second sample- containment region and the input opening of the third sample-containment region, wherein the first, second, and third fluid communications are arranged such that upon spinning the device about an axis of rotation while the holder holds the device in the first orientation, the device is capable of moving a liquid through the first and third fluid communications while preventing the liquid from moving through the second fluid communication, upon spinning the device about an axis of rotation while the holder holds the device in the second orientation that differs from the first orientation, the device is capable of moving the liquid through the second fluid communication while preventing the liquid from moving through the first and third fluid communications, and the different orientations of the holder on the rotatable platen provide different orientations of the one or more sample processing pathways relative to the rotatable platen.

29. The device of claim 28, wherein the third sample-containment region includes an output opening and each of the one or more sample processing pathways further comprises a fourth sample-containment region including an input opening, and a fourth fluid communication capable of directing a material from the output opening of the third sample-containment region to the input opening of the fourth sample-containment region.

30. The device of claim 28, wherein the one or more sample processing pathways are formed in the substrate.

31. The device of claim 28, further comprising at least one cover that at least partially defines the one or more sample processing pathways.

32. The device of claim 28, wherein the substrate is shaped as a rectangular card.

33. The device of claim 28, wherein the substrate is shaped as a circular disc.

34. The device of claim 28, wherein at least one of the first sample containment region, the second sample-containment region, and the third sample-containment region, has a volume of from about 0.5 μl to about 500 μl.

35. The device of claim 28, wherein the fluid processing pathway is free of valves.

* * * * *